March 22, 1927.  1,621,922
R. G. BRYANT
COMBINATION TABLE AND LUGGAGE CARRIER
Filed Aug. 1 1925  2 Sheets-Sheet 1
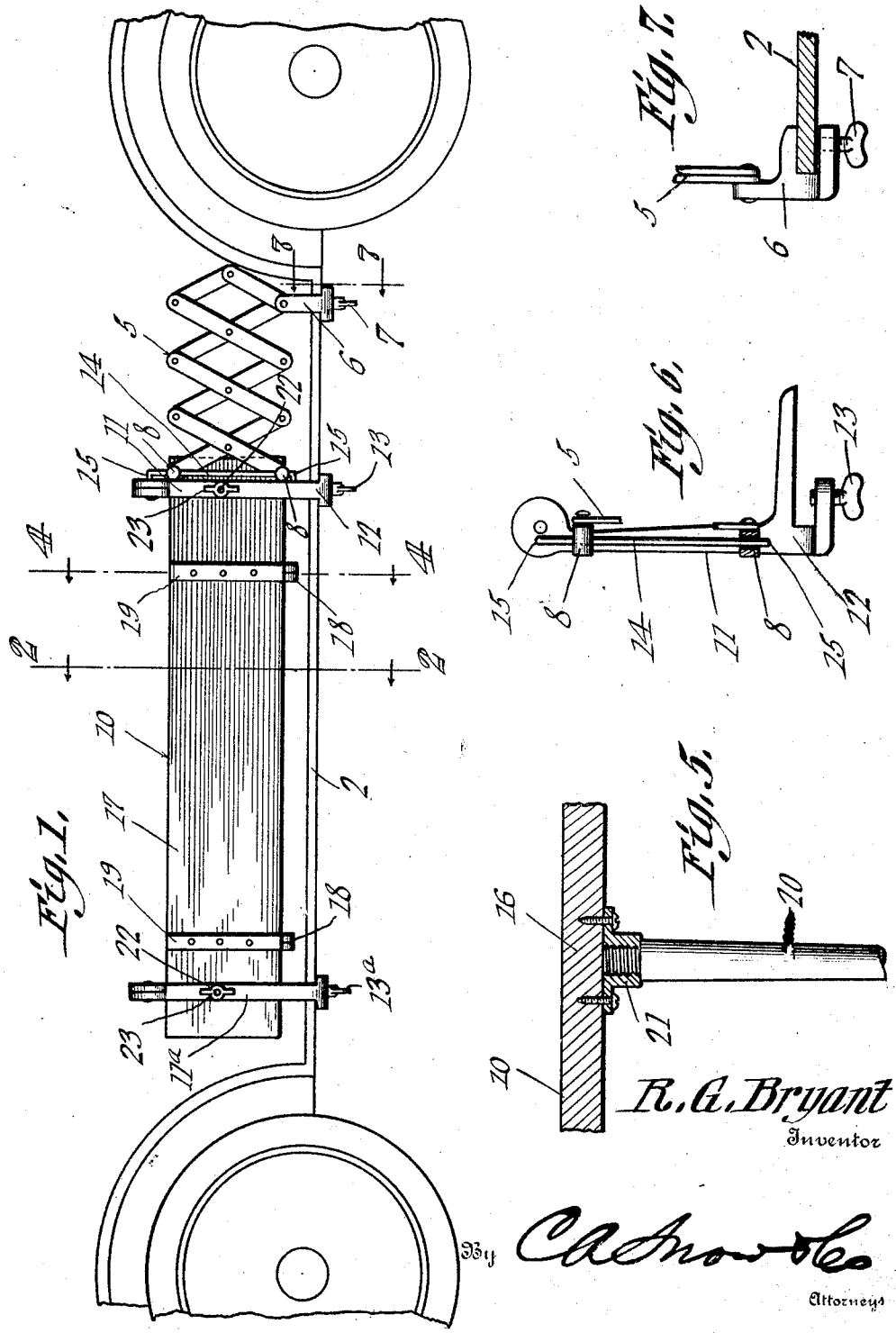

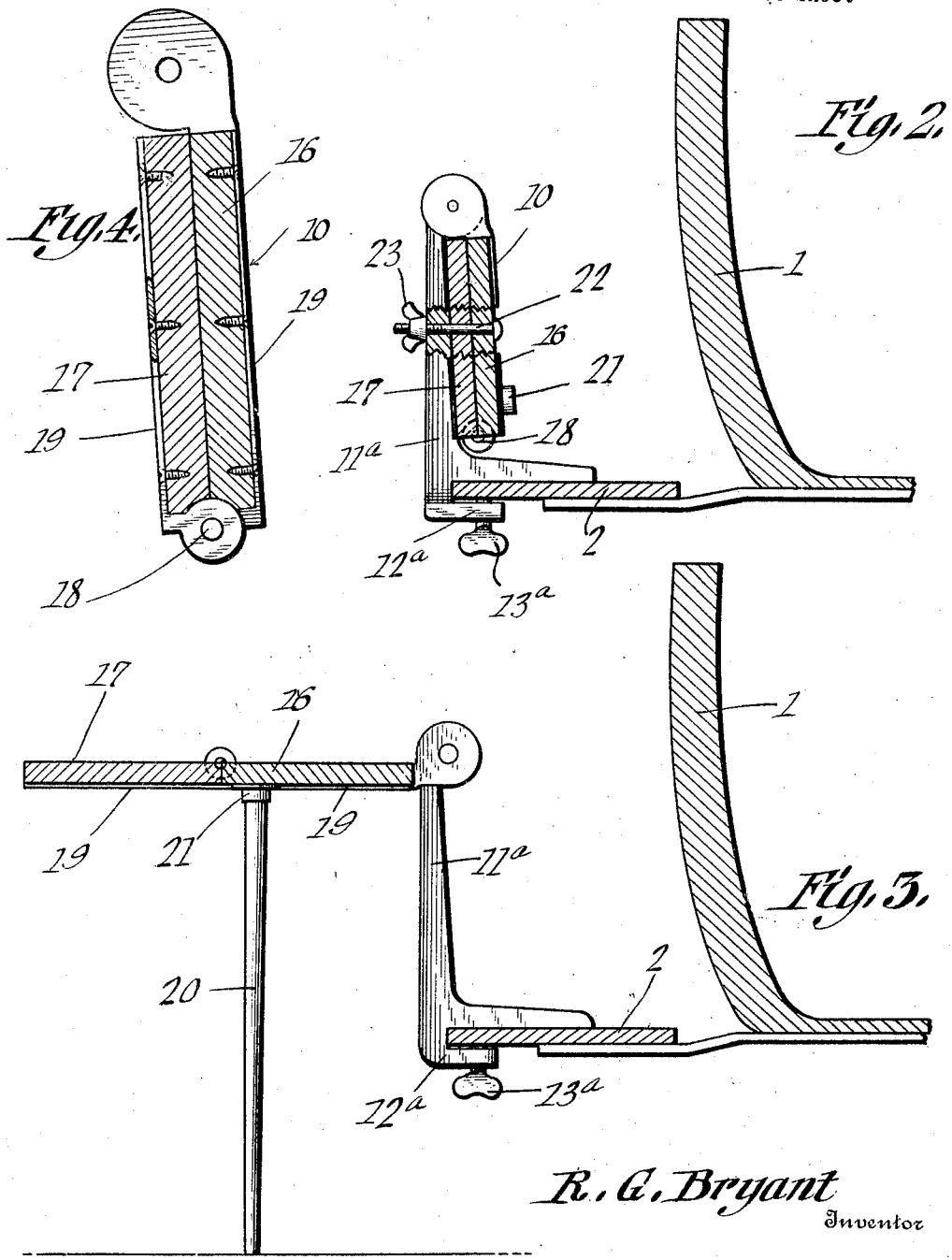

Patented Mar. 22, 1927.

1,621,922

UNITED STATES PATENT OFFICE.

ROLAND GUY BRYANT, OF CARTERVILLE, MISSOURI.

COMBINATION TABLE AND LUGGAGE CARRIER.

Application filed August 1, 1925. Serial No. 47,569.

This invention relates to a combined table and luggage carrier for automobiles and the object thereof is to provide a simple device of this character which may when folded up be used as a luggage carrier and when opened out used as a table such as is useful in camping for various purposes.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a portion of an automobile with this improved device shown applied in folded position ready for use as a carrier;

Fig. 2 is a transverse section taken on the line 2—2 of Fig. 1;

Fig. 3 is a transverse section with the table shown open, ready for use;

Fig. 4 is a transverse section taken on the line 4—4 of Fig. 1;

Fig. 5 is a detail sectional view showing the means for connecting the detachable legs to the table;

Fig. 6 is an end elevation of the table portion of the carrier with parts in section;

Fig. 7 is a detail sectional view taken on the line 7—7 of Fig. 1.

In the embodiment illustrated a portion of an automobile body is shown at 1 with the running board shown at 2 and on which the luggage carrier is usually mounted.

The luggage carrier constituting this invention comprises the usual lazy-tong structure shown at 5 which is provided at one end with a suitable clamp 6 designed to be secured to the running board 2 by a set screw 7. The other end of the lazy-tong structure 5 is mounted on an upright 11 constituting a part of the support for the table 10. This upright 11 has a clamp 12 at its lower end which is designed to straddle the running board edge and is secured by the usual set screw 13. A similar upright 11ª is mounted at the opposite end of the table 10 and is exactly like the upright 11 except that there is no lazy-tong structure connected therewith and consequently the means for connecting it is omitted. A rod 14 is secured to the front face of the upright 11 being offset therefrom by its ends 15. Sleeves 8 are slidably mounted on the rod 14 and form connectors for the links of the section 5 as is shown clearly in Figs. 1 and 6. The table 10 which when in folded position constitutes a portion of the luggage carrier is composed of two leaves 16 and 17 hingedly connected along one edge at 18. These leaves 16 and 17 are of the same width as is shown clearly in Figs. 2 and 4 and have strap hinges secured to their lower faces as shown at 19 the hinged members of the hinges 19 extend transversely across the table sections and operate as braces therefore in addition to hingedly connecting them. The inner section 16 is hinged to the upper ends of the uprights 11 and 11ª and when swung outward and upward into the position shown in Fig. 3 these sections constitute a table top which is supported by a detachable leg 20 which is shown threaded into a socket 21 carried by the lower face of the table leaf or section 16 adjacent its hinged edge.

The leaves or sections 16 and 17 have registering apertures therein designed to receive securing bolts 22 which also pass loosely through the standards 11 and 11ª and are secured in operative position by wing nuts 23. These bolts 22 hold the table sections when folded securely connected to the standards and form the supports constituting the outer wall of the luggage carrier, the inner wall of which is formed by the body of the automobile 1.

When the device is designed for use as a luggage carrier it will assume the position shown in Figs. 1 and 2 and when opened up for use as a table the position shown in Fig. 3.

When in use as a carrier this device presents a neat attractive appearance and when opened up for use as a table is equally attractive.

The entire device may be removed from the running board 2 by unscrewing the bolts which connect the clamps to the running board, and of course may be applied by reversing this operation.

I claim:—

A combined running board luggage carrier and table including standards having clamps at their lower ends to clamp the device to a running board, a pair of leaf sections, hinges for connecting the leaf sections, said hinges connecting the lower edges of the leaf sections, hinges connected with one edge of one of the leaf sections and having connection with the standards to allow the sections to swing upwardly and outwardly beyond the outer edge of the running board to which the device is connected to provide a table, and removable leg sections secured to one of the leaf sections for supporting the leaves as a table beyond the running board.

In testimony that I claim the foregoing as my own, I have hereto affixed my signature.

ROLAND GUY BRYANT.